(12) United States Patent
Wilson

(10) Patent No.: US 6,340,990 B1
(45) Date of Patent: Jan. 22, 2002

(54) SYSTEM FOR DEINTERLACING TELEVISION SIGNALS FROM CAMERA VIDEO OR FILM

(75) Inventor: Stephen S. Wilson, Ann Arbor, MI (US)

(73) Assignees: Applied Intelligent Systems Inc., Ann Arbor, MI (US); Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 09/052,150

(22) Filed: Mar. 31, 1998

(51) Int. Cl.[7] .......................... H04N 7/01; H04N 11/20
(52) U.S. Cl. .................. 348/448; 348/449; 348/451; 348/452
(58) Field of Search ................ 348/448, 449, 348/451, 452, 458, 443; H04N 7/01, 11/20

(56) References Cited

U.S. PATENT DOCUMENTS

| | | | | |
|---|---|---|---|---|
| 4,626,891 A | * | 12/1986 | Achiha | 348/702 |
| 5,027,201 A | * | 6/1991 | Bernard | 358/105 |
| 5,060,064 A | * | 10/1991 | Lamnabhi et al. | 358/105 |
| 5,381,182 A | * | 1/1995 | Miller et al. | 348/448 |
| 5,410,357 A | * | 4/1995 | Rieger et al. | 348/458 |
| 5,488,421 A | | 1/1996 | Hwang et al. | 348/448 |
| 5,539,466 A | * | 7/1996 | Igarashi et al. | 348/401 |
| 5,596,371 A | * | 1/1997 | Pakhchyan et al. | 348/452 |
| 5,661,525 A | * | 8/1997 | Kovacevic et al. | 348/452 |
| 5,663,765 A | | 9/1997 | Matuse et al. | 348/448 |
| 5,682,205 A | * | 10/1997 | Sezan | 348/452 |
| 5,703,968 A | | 12/1997 | Kuwahara et al. | 382/269 |
| 5,748,250 A | * | 5/1998 | Markandey et al. | 348/451 |
| 5,796,437 A | | 8/1998 | Muraji et al. | 348/452 |
| 5,872,604 A | * | 2/1999 | Ogura | 348/699 |
| 5,917,554 A | * | 6/1999 | Ohta | 348/581 |
| 5,926,224 A | * | 7/1999 | Nagasawa | 348/413 |
| 5,949,476 A | * | 9/1999 | Pocock et al. | 348/24 |
| 6,061,100 A | * | 5/2000 | Ward et al. | 348/607 |
| 6,118,488 A | * | 9/2000 | Huang | 348/452 |

FOREIGN PATENT DOCUMENTS

| | | | | |
|---|---|---|---|---|
| FR | 5386237 | * | 1/1995 | 348/458 |
| GB | 4862266 | * | 8/1989 | 358/105 |
| GB | 5313281 | * | 5/1994 | 348/443 |
| JP | 5663765 | * | 9/1997 | 348/448 |
| JP | 5703968 | * | 12/1997 | 348/448 |
| JP | 5796437 | * | 8/1998 | 348/452 |
| KR | 5428397 | * | 6/1995 | 348/448 |
| KR | 5488421 | * | 1/1996 | 348/448 |

\* cited by examiner

*Primary Examiner*—Reinhard J. Eisenzopf
*Assistant Examiner*—Linus H. Lo

(57) ABSTRACT

A method and apparatus is disclosed for converting an interlaced television display to a progressive, scan, or non-interlaced display where artifacts are removed if the source of the signal is from a movie film to television converter, a video recording of a movie, a live camera, or a camera output captured on a video recording system, or any sequence of the above, by utilizing three motion detection stages.

12 Claims, 4 Drawing Sheets

SYSTEM FOR DEINTERLACING TELEVISION SIGNALS FROM CAMERA VIDEO OR FILM

FIELD OF INVENTION

The present invention relates to a method for converting an interlaced television display to a progressive, scan, or non-interlaced display where artifacts are removed if the source of the signal is from a movie film to television converter, a video recording of a movie, a live camera, or a camera output captured on a video recording system, or any sequence of the above.

BACKGROUND OF THE INVENTION

The NTSC system for television broadcasting of images or frames that contain 525 lines involves transmitting a first field of 262.5 rows of even parity followed by a second field of 262.5 rows of odd parity. The fields are transmitted at a rate of 60 Hz, while the frames are transmitted at a rate of 30 Hz. On small television displays, the eye can easily integrate the sequence of lower resolution odd and even row images to give the impression of higher resolution 525-row images. However on large displays, the eye can see the effects of interlace as annoying artifacts because of the larger pixel size. The persistence of the illumination of the image on larger screens is shorter and leads to a noticeable flicker.

It is desirable on large screen displays to deinterlace the image by merging odd parity and even parity fields together to form fields with the full resolution. However, it is well known that if the merging is done simply by interline averaging or simply overlaying the odd and even fields, there is a severe degradation in the picture quality because of the motion of objects from one field to the next.

The problem of deinterlacing is to construct the missing even lines from odd fields, and the missing odd lines from the even fields. A number of systems have been disclosed that attempt to solve the problems of deinterlacing. One method such as disclosed in U.S. Pat. No. 4,057,835 involves a motion detector that provides a signal for those areas that contain a moving object. Those areas are processed differently than an area where there is no motion. For example, in an area of an odd field where there is no motion, the missing lines could simply be computed by averaging each corresponding line in the two adjacent even fields. Where there is motion, the missing lines can be computed from the lines above and below within the same odd field.

If there is in fact no motion in a region of a sequence of fields, it is always easily possible to reliably detect that case and supply an accurate computation of the missing lines. If there is in fact motion in a region of a field, it is not always possible to detect that motion. Even when the motion is detected, it is not always possible to supply an accurate computation of the missing lines. Thus, errors in deinterlacing will occur in areas where there is motion.

In some systems, motion is detected by analyzing two adjacent fields of the same parity on either side of the field for which the deinterlaced line is undergoing computation. If these two fields are substantially the same, then no motion is inferred. This method works for slowly moving objects. When the object is moving very fast across a still background, the object may be in one field at a certain location, but may not be present at all in the two opposite parity fields immediately before and after the field. The motion detector will sense the same background in both adjacent fields and infer that there is no motion and will erroneously merge the data in the adjacent fields with the field undergoing computation. Artifacts will result as disclosed by Powers in U.S. Pat. No. 4,400,719.

A temporal median filter disclosed by Faroudja in U.S. Pat. No. 4,989,090 also exhibits artifacts when the motion of an object is very fast. The median operates between a first field of one parity a second preceding adjacent field and third subsequent adjacent field, both of opposite parity. For a very fast moving object, over a constant background, the two adjacent fields will have substantially the same pixel values over a neighborhood. Thus the median filter will choose the value of one of the adjacent fields and use it incorrectly as the interlaced value for the first field.

If the source of the video signal is derived from a movie film to television converter, the motion detection problem is much different. A film sequence is transferred at a rate of 24 frames per second. The most common film transmission technique is to use what is called a three to two pull-down ratio where a first film frame is projected for three sequential television fields, and the next film frame is projected for two sequential television fields. The deinterlacing concept of using a motion detector and motion dependent field merging is not the best procedure for film sequences.

One way of handling deinterlacing of film sequences is to first detect that the fields are transmitted in the three to two pull-down ratio by a technique such as disclosed by Faroudja in U.S. Pat. No. 4,982,280. There is no notion between some pairs of fields because the film is guaranteed to be stationary for at least two fields. Thus the next step for deinterlacing film is to associate the corresponding odd and even fields that actually belong to the same film frame and then interleave lines of those fields to form a progressive scan as disclosed by Faroudja in U.S. Pat. No. 4,876,596.

Although Faroudja's method often gives excellent results for film sequences using the most popular three to two pull-down ratio, the method has some drawbacks. Faroudja's method does not work for older Interlaced Telecine film converters that capture 2½ film frames for each pair of television fields. Every third field will contain one film frame in the upper half and the next film frame in the lower half. There is no correct pairing of fields that will eliminate annoying artifacts for these split fields.

Another drawback of Faroudja's method is that it requires a sequence of several television fields before the phase of the fields can be determined with respect to the film frame. When film that had been converted to a video tape recording is edited or when film clippings are interspersed between live video, the phase of the fields can suddenly alter. Thus there could be frequent interruptions of the phase, and the attendant failings of the deinterlacing method could cause annoying artifacts while the phase is being resynchronized.

SUMMARY OF THE INVENTION

The general object of this invention is to overcome some of the drawbacks in the prior art of television display deinterlacing.

Another object of this invention is to provide a motion detector that functions when the video sequence is so rapidly changing that motion cannot be inferred from two adjacent fields of the same parity.

Another object of this invention is to provide one single method that will minimize motion artifacts in both camera video, and video recordings of film in any of the film-to-television converters.

Another object of this invention is to provide a fast detection of movie film so that artifacts are Minimized during switchover when video recordings derived from film are edited or merged with camera video output.

The method of the present invention can be realized in a low cost fine grained programmable massively parallel processor (MPP) such as disclosed by Wilson in U.S. Pat. No. 5,557,734 incorporated herein by reference.

In the current invention, the missing interlaced lines of a field are first supplied by a simple interpolation between adjacent lines of that field. Next, a sequence of steps in the processor forms a first motion detector, that detects areas of motion between fields and substitutes an appropriate correction to those areas in the field that have no motion. Then, a second more complex motion detector that spans a range of five fields is used to test for motion over a longer time period. This motion detector may reverse the decision of the first motion detector. Often when an object is very quickly moving over a still background, neither of the first two motion detectors will detect motion because they erroneously determine that since the background areas of adjacent fields are the same, there is no motion. The result is an image that is broken into stripes or striations. To guard against this case the field is compared to two adjacent fields to see if stripes would occur in the progressively scanned output image. If such is the case then, motion is inferred and the decisions of the first two motion detectors are reversed.

Even after the preceding motion compensation steps, the computed missing lines still may be inaccurate when the video source is from a movie film sequence. A final step is to compare each area of a first field with adjacent fields of opposite parity to see if there is a good match with one of the adjacent fields. For areas where there is a good match, pixels from the first field are replaced with the corresponding pixels of the adjacent field that has the best match. If both adjacent fields are equally good in replacing the pixel of the first field, then the pixel from the preceding field is always used although it may be incorrect. That is, the other adjacent field should have been used because it was the one that was scanned while the film frame was stationary.

DETAILED DESCRIPTION OF A PREFERRED EMBODIMENT

Processing of video signals according to the present invention consists of a chain of different operations to eliminate various possible artifacts that occur in deinterlacing. The combination of all operations is preferable, but some operations in the chain can be left out with varying degrees of degradation. The process of computing a full progressive scan frame involves computing missing lines in each odd or even field. The methods of this invention will describe the missing lines of a first field in terms of generating a new second field of opposite parity, called the interlaced field, to be later interleaved with a corresponding first input field.

The method of this invention will be described in terms of operations on fields stored in memory 9 shown in FIG. 1. These memory locations are called FIELD0, FIELD1, FIELD2, FIELD3 and FIELD4. The memory areas that store the fields are large enough to store typically 512 wide by 256 high images. The method is simplest if a hardware method operates on data stored at the same memory locations as each new field arrives during a real time flow of a video sequence. Thus, since several fields are needed for processing, the data in each stored field must be moved in a pipeline or First-In-Last-Out ("FILO") fashion from one memory area to the next as each new field is brought into the system.

Figure 1:
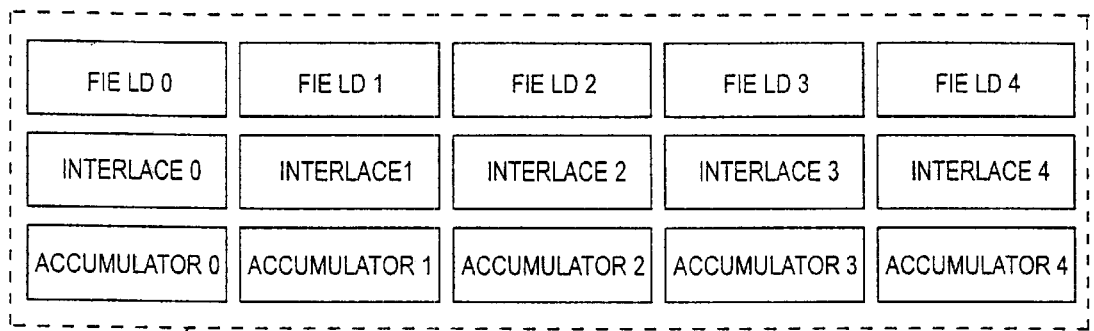
FIG. 1 shows a block diagram of various memory areas for storing fields, interlace calculations, and accumulators that represent the degree of motion according to the present invention.

Also shown in FIG. 1 are memories to store the interlace computations. The data at INTERLACE0 are the missing data lines of opposite parity that must be supplied interstitially to FIELD0. The data at INTERLACE1 are the missing data lines of opposite parity that must be supplied interstitially to FIELD1, and so forth through INTERLACE4. ACUMULATOR0 through ACCUMULATOR4 are memory to store data values that indicate the local accuracy of the motion compensation computation.

Figure 2:
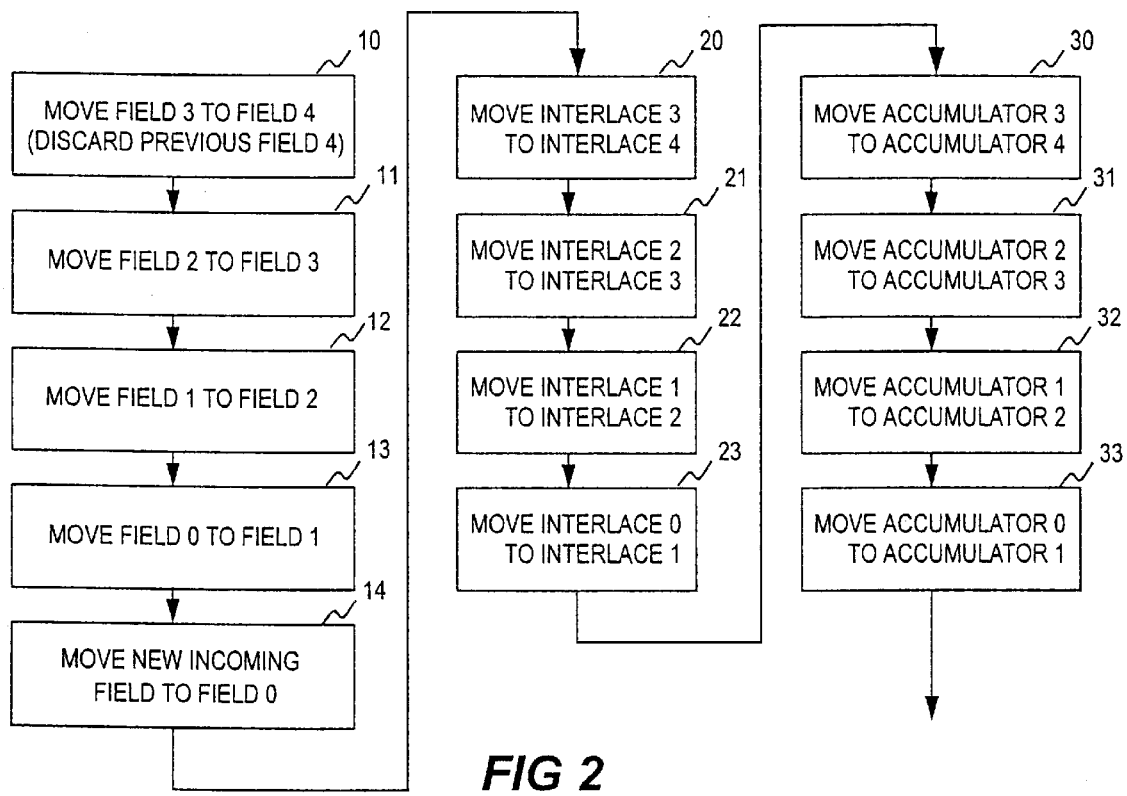
FIG. 2 shows a flow diagram of steps in moving the various memory areas as a new field enters a computational system of the present invention.

FIG. 2 shows how data is moved immediately prior to the processing of a new input field. The first operation at step 10 is to move the data from FIELD3 storage to FIELD4 storage and discard the contents of what was in the FIELD4 storage. The next operations at steps 11, 12, and 13, are to similarly move the data in other fields. At step 14, the new Is incoming image is stored at FIELD0. In this manner, a new field is brought in to be stored in FIELD0 after all the other field data has all been moved along the pipeline in a FILO fashion.

Similarly, at step 20 in FIG. 2, the data at INTERLACE3 is moved to INTERLACE4 and the data that was at INTERLACE4 is discarded. At steps 21 and 22 the interlace data is similarly moved. At step 23 the INTERLACE0 data is moved to INTERLACE1 so that a new interlace computation for FIELD0 can be placed at INTERLACE0. At step 30 in FIG. 2, the data at ACCUMULATOR3 is moved to ACCUMULATOR4 and the data that was at ACCUMULATOR4 is discarded. At steps 31 and 32 the accumulator data is similarly moved. At step 33 the ACCUMULATOR0 data is moved to ACCUMULATOR1 so that new motion data for FIELD0 can be placed at ACCUMULATOR0.

Figure 3:
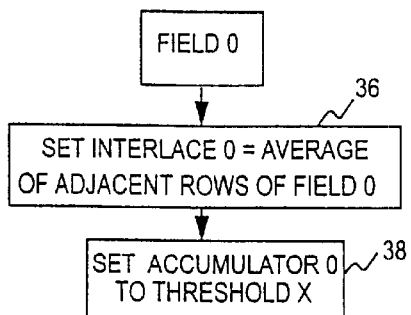
FIG. 3 is a flow diagram of initialization steps of the present invention.

FIG. 3 shows a first set of computations according to the present invention. The simplest interlace computation is to provide the computed interlaced field by a simple interpolation. At step 36, the average of the adjacent rows of the input FIELD0 is written into memory INTERLACE0. As is well known, this simple computation gives rise to many artifacts. However, for regions where there is fast complex motion in the video sequence, the interpolation is often the only method that reliably works and is the default computation when motion is detected. Subsequent computations will replace the simpler default interpolation with a more accurate calculation where possible. At step 38, all image pixels in ACCUMULATOR0 are initialized to a constant value, threshold X. A large value at all locations in ACCUMULATOR0 is an initial starting value that represents a large degree of motion at all points in the image.

Figure 4:
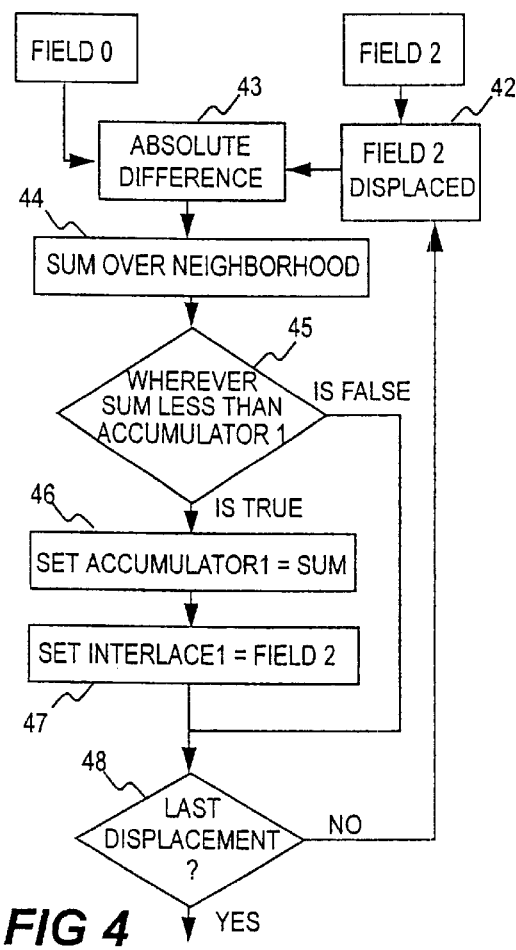
FIG. 4 is a flow diagram of a first motion detection and compensation method of the present invention.

FIG. 4 shows the next steps in the chain of operations for motion detection and compensation of the present invention. This type of compensation is similar to methods well known in the field as discussed for example in M. Weston, "Fixed, Adaptive, and Motion Compensated Interpolation of Interlaced TV Pictures," in Signal Processing of HDTV, pp. 401–408, 1988 and is similar in principle to the invention disclosed by K. Kinuhata in U.S. Pat. No. 4,057,835, both incorporated herein by reference. At step 42, data at FIELD2 is all uniformly displaced by one row up in the vertical direction. At step 43, the absolute values of the difference between corresponding pixels in FIELD0 and displaced FIELD2 is computed to form a new intermediate difference image. This difference image for FIELD0 and FIELD2 are for fields of the same parity. At step 44, a sum of three adjacent pixels in the vertical direction of the difference image of absolute values is accumulated and stored in a new intermediate sum image. At those pixel locations where the sum of differences is small, there is very little difference between FIELD0 and displaced FIELD2. Conversely, pixel locations in the sum image that are large indicate regions where there is a large degree of mismatch between FIELD0 and displaced FIELD1. At step 45, the sum of differences is compared to ACCUMULATOR1. ACCUMULATOR0 was set to threshold X in step 30 of FIG. 3, and had been previously moved to ACCUMULATOR1 in step 33 of FIG. 2. Thus, step 45 is a motion detection computation consisting of a comparison of the sum of differences computed at step 44 with a constant threshold value. For those pixels where the comparison is true, the sum of differences is smaller than ACCUMULATOR1 and indicates a neighborhood where the motion is small. In this case, at step 46 ACCUMULATOR1 is replaced by the sum of differences computed at step 44. Since the local region of motion is small at step 47, INTERLACE1 computation is replaced by the pixels at FIELD2 which is a better computation than the current value of the adjacent row average computed at step 38 in FIG. 3. Step 47 is a motion compensation computation. For those pixels where the sum of differences computed in step 34 is not less than ACCUMULATOR1 as computed by step 45, the comparison is false, and no further action is done on the corresponding pixels in ACCUMULATOR1 and INTERLACE1.

At step 48, the displacement is set so that FIELD2 is uniformly displaced by one row down in the vertical direction in step 42. The sums of absolute differences are recomputed at steps 43 and 44. At step 45, the accumulator is again compared to the sum of absolute differences. Thus, step 45 is a comparison of the sum of differences computed at step 44 with the constant threshold X value or the value of the previously computed sum of differences which is lower than threshold X. Those pixels where the newly computed sums of differences is lower is determined in step 45. In steps 46 and 47, ACCUMULATOR1 and INTERLACE1 are updated.

At step 48, the displacement is set so that FIELD2 is not displaced. The sums of absolute differences are recomputed at steps 43 and 44. At step 45, the accumulator is again compared to the sum of absolute differences. Those pixels where the newly computed sums of differences is lower is determined in step 45 and represents the fact that there is no motion between adjacent fields of the same parity. In steps 46 and 47, ACCUMULATOR1 and INTERLACE1 are updated. At step 48, it is determined that there are no further displacements, so the algorithm proceeds to the next group of steps. A low value at a region in ACCUMULATOR1 now represents the fact that a good motion compensation fit has been found when FIELD0 is compared to FIELD2 at some displacement including zero displacement.

Figure 5:
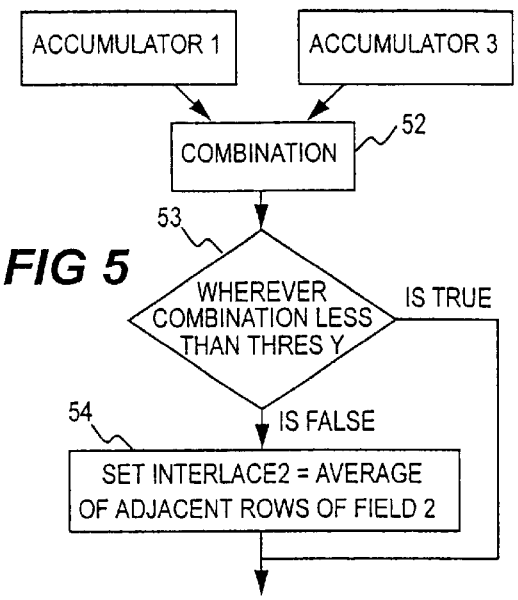
FIG. 5 is a flow diagram of a second motion detection method of the present invention that detects motion over a wider time span of fields.

FIG. 5 illustrates the next operations in the deinterlace computation which further eliminate motion artifacts. Because of the pipeline movement of memory illustrated in steps 30 through 33 in FIG. 2, ACCUMULATOR1 and ACCUMULATOR3 contain pixel data that indicate the degree of motion respectively about FIELD1 and FIELD3. ACCUMULATOR1 and ACCUMULATOR3 are combined at step 52 in FIG. 5. The combining operation is preferably an average, but could represent for example a minimum. A region in the accumulators combined in step 52 will contain relatively small values if there is little motion in both FIELD0 compared to FIELD2 and FIELD4 compared to FIELD2. If the combination is less than threshold Y, the comparison at step 53 is true, and the motion is deemed small in a larger time frame that spans a range from FIELD0 to FIELD4. In this case the interlace calculation is left unchanged. If the combination is larger than threshold Y, the comparison at step 53 is false, and the motion in the larger time frame is large. In this case the motion compensation at some region computed in FIG. 4 is deemed unreliable, and in step 54 INTERLACE2 computation is set to a more reliable value which is the average of adjacent rows of FIELD2, as computed by step 36 in FIG. 3.

Figure 6:
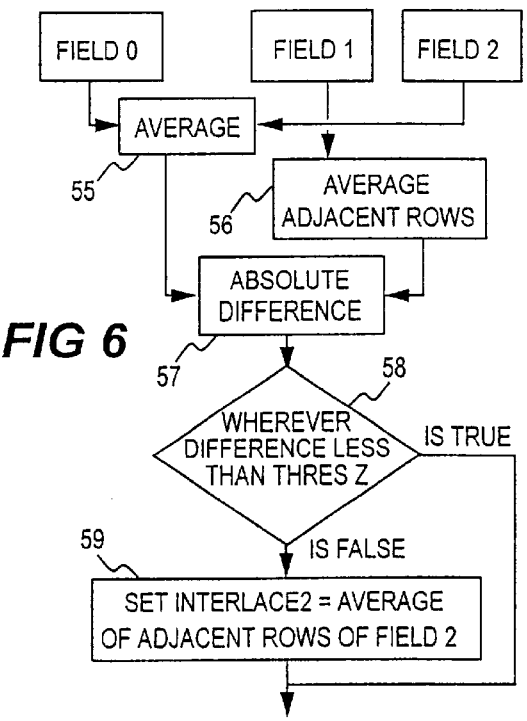
FIG. 6 is a flow diagram of steps detecting striations caused by very fast moving objects according to the present invention.

FIG. 6 is a flow diagram of detecting striations caused by very fast motion against a still background. FIELD0 and FIELD2 are averaged in step 55. In step 56, adjacent rows of FIELD1 are averaged to form an approximation of the missing lines of FIELD1. In step 57, the absolute difference of steps 55 and 56 are computed and then compared to a threshold Z in step 58. Wherever the difference from step 57 is less than threshold Z, the averaged fields from steps 55 and 56 are close. This means that possible striations from fast motion is small and the interlace computation may be accurate, and is thus not changed. Wherever the absolute difference is large, there is a strong possibility of striations and the pixels at those locations in the INTERLACE2 computation is replaced by the average of adjacent rows as computed in step 59.

Figure 7:
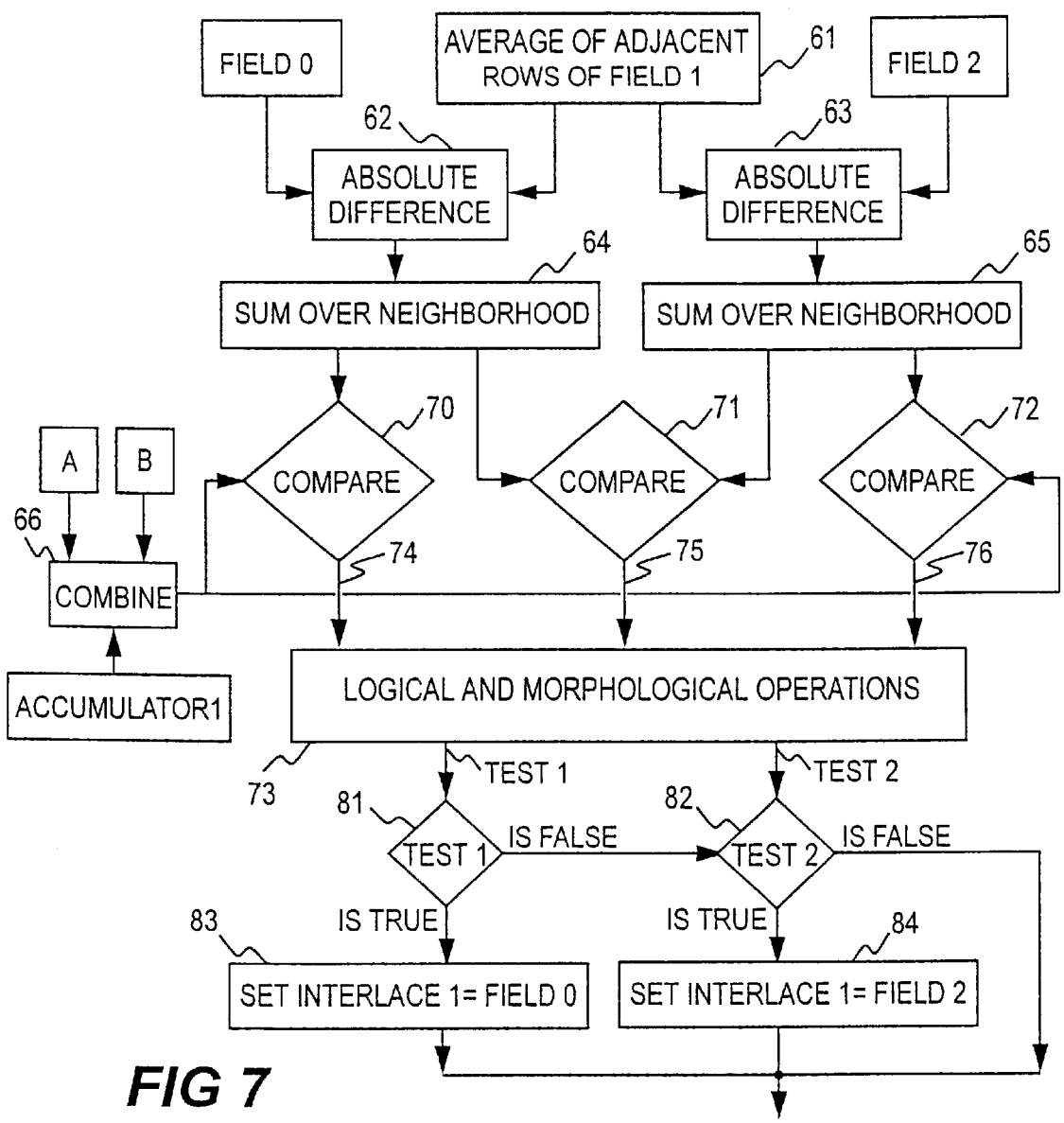
FIG. 7 is a flow diagram of steps that replace local regions in the current interlace computation with the best fitting pixel in an adjacent field according to the present invention.

FIG. 7 illustrates the final steps in the deinterlace computation. The average of adjacent rows of FIELD1 is computed in step 61, and represents an approximation to the computation for INTERLACE1. The absolute value of the difference of the average from step 61 is computed for FIELD0 at step 62 and for FIELD2 at step 63. A sum over a neighborhood of absolute differences is computed in steps 64 and 65, where the neighborhood is preferably a 3×3 neighborhood. For those pixels where there is little motion between FIELD0 and FIELD1, the sums from step 64 will be small. For those pixels where there is little motion between FIELD2 and FIELD1, the sums from step 65 will be small. The operation in step 66 computes a linear function value A×(accumulator 1)+B, which is a value related to the amount of motion about FIELD1. Step 70 is a comparison between the sum from step 64 and output from step 66. Step 72 is a comparison between the sum from step 65 and output from step 66. Step 71 is a comparison between the sum from step 64 and the sum from step 65. The comparison outputs, 74, 75, and 76 respectively from steps 70, 71, and 72 are combined in step 73 which has two logical image outputs TEST1 and TEST2 that enter comparison steps 81, and 82. In step 83, pixels from FIELD0 replace those pixels in INTERLACE1 computation at those pixel sites where TEST1 in step 81 is true. In step 84, pixels from FIELD2 replace those pixels in the INTERLACE1 computation at those pixel sites where TEST2 from step 73 is true and TEST1 is false. INTERLACE1 pixels are left unchanged at those pixel sites where TEST1 and TEST2 are both false.

Figure 8:
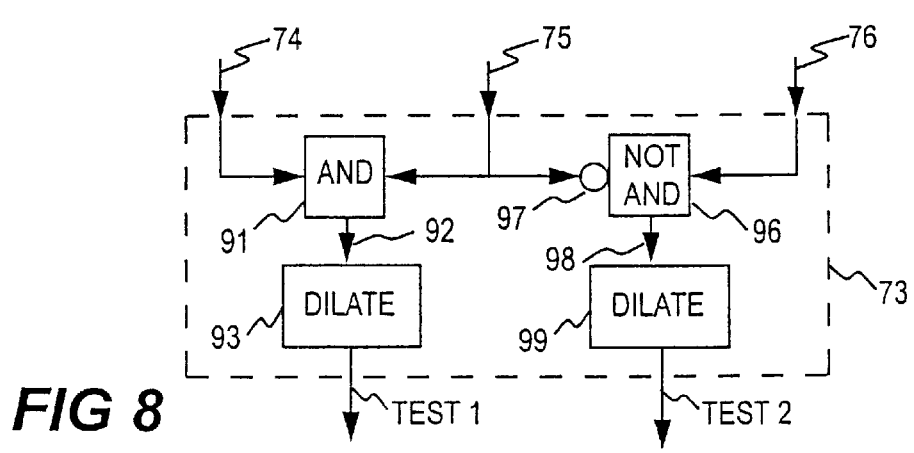
FIG. 8 shows a preferred arrangement of logical and morphological steps to chose which regions in an adjacent field are to replace pixels in a interlace computation.

FIG. 8 shows preferred logical and morphological operations 73 that provide logical image outputs TEST1 and TEST2. Each pixel of comparison image 74 undergoes a logical AND in step 91 with each corresponding pixel of comparison image 75 to form a new image, 92 that is dilated in step 93 to form image TEST1. Each pixel of comparison image 76 undergoes via 97 a logical NOT AND in step 96 with the logical inversion of each corresponding pixel of comparison image 75 to form a new image 98 that is dilated in step 99. The morphological dilations in steps 93 and 99 cause the respective input images 92 and 98 to enlarge by one pixel in radius so that the output of the dilations, respectively TEST1 and TEST2, fill back the edges that might be blurred in the neighborhood summations in steps 64 and 65 of FIG. 6. The blurred edges might be less than the output of step 66 and fail to give the correct comparison at steps 74 and 76. There are a number of other logical operations that could be substituted in the logical and morphological operations 73. For example, dilation steps 93 and 99 could be performed before the logical AND steps 91 and 96.

In FIG. 7, comparisons in steps 70 and 72 with the linear function from step 66 causes a comparison to be made between the amount of local motion and the amount that FIELD1 differs either FIELD0 or FIELD2. Coefficients A and B are constants adjusted so that if the amount of motion is large, the comparisons in steps 70 and 72 will require that either FIELD0 or FIELD2 must be very similar to FIELD1 in a local area before a substitution is made in steps 81 or 82. The consequence is that if the source of the video sequence is a movie film, it is more likely that the correct adjacent field will be used for the substitutions in steps 83 and 84 because at least one of the adjacent fields was stationary with respect to FIELD1 while the film was being captured. If the source of the video sequence is from a camera, it is less likely that local data from an adjacent field will be substituted erroneously when there is large local motion.

Figure 9:
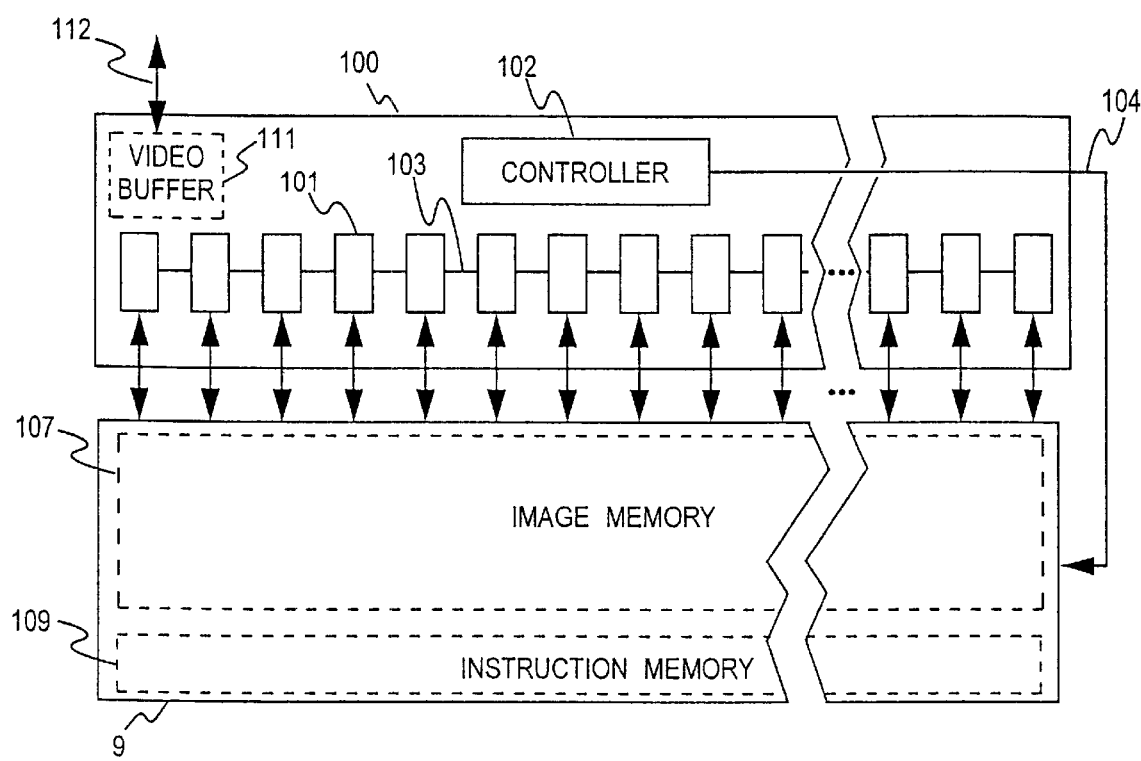
FIG. 9 shows a parallel processor of the present invention with a linear chain of processing elements.

FIG. 9 is a block diagram of a parallel processor system that stores the images in memory storage 9 shown in FIG. 1, and has the speed to realize the steps shown in FIGS. 2 through 8 at real time video rates. The parallel processor 100 is disclosed in detail by Wilson in U.S. Pat. No. 5,557,734, incorporated herein by reference. Processor 100 consists of a large number of processing elements 101 in a linear chain where each processing element 101 communicates neighborhood data to adjacent processing elements via communication lines 103. Preferably, there is one processing element 101 for every column in the image. Coupled to processor 100 is a large memory 9 that holds both image data 107 and instructions 109. Controller 102 within processor 100 provides a instruction memory address through line 104 to memory 9 and loads instructions from memory area 109. Controller 102 then provides a data address to memory 9, and loads entire rows of image data from memory area 107 to processing elements 101. Controller 102 then causes processing elements 101 to execute the instructions on the rows of image data. After processing the entire row at once, the processed data that results from the instruction is written back to memory area 107, and a new instruction is fetched from memory area 109. The process continues in a like manner until all steps in the algorithm are completed. Video data enters video buffer 111 through external connections 112 and is transferred to memory 9 by connections that are not shown. Also video data can enter buffer 111 from memory 9 and be transferred out of processor 100 through external connections 112. Complex algorithms can be completed in 16 milliseconds, the rate at which video fields enter the processor. When all steps of the algorithm are completed, only INTERLACE4 image is transferred out of the memory 9 via video buffer 111 and line 112. INTERLACE4 image is merged with FIELD4 and displayed in external hardware not shown.

Having fully described the preferred embodiments of the invention, variations and modifications may be employed without departing from the scope of the present invention. Accordingly, the following claims should be studied to learn the true scope of the present invention.

What is claimed is:

1. A method of deinterlacing video signals of video sequences obtained from a video source, each of said video sequences include a plurality of fields, each of said plurality of fields including a plurality of lines, the method comprising:

(a) performing interpolation between adjacent lines in a first field to provide missing interlaced lines associated with said first field;
   (b) detecting for motion by comparing said first field with said plurality of fields, the step of detecting motion further including:
      a first motion detection step for detecting areas of motion by comparing said interpolation of said first field with a previous adjacent field, and
      a second motion detection of said detecting areas of motion by comparing said interpolation of said first field with a following adjacent field;
   (c) comparing outputs of the first and second motion detection steps at each pixel with a threshold;
   (d) replacing pixels in said interpolation of said first field with corresponding matched pixels from said previous adjacent field whenever the first motion detection output exceeds said threshold and replacing pixels in said first interpolation of said first field with corresponding matched pixels from said following adjacent field whenever said second motion detection output secedes said threshold; and
   (e) repeating steps (a)–(d) with said plurality of fields thereby processing said deinterlaced video signals.

2. The method of claim 1, wherein said plurality of fields is within five fields.

3. The method of claim 1, wherein step (b) further includes a third motion detection step for detecting areas of motion by comparing said first field with adjacent fields and determining that motion is present in said areas if stripes occur.

4. An apparatus for deinterlacing video signals of video sequences obtained from a video source, each of said video sequences include a plurality of fields, each of said plurality of fields including a plurality of lines, comprising a video signal processor including:

means for preforming interpolation between adjacent lines in a first field to provide missing interlaced lines associated with said first field;
   means for detecting motion by comparing said first field with said plurality of fields, the motion detecting means including;

a first motion detector for detecting areas of motion by comparing said interpolation of said first field with a previous adjacent field; and a second motion detector for detecting areas of motion by comparing said interpolation of said first field wit a following adjacent field;

means for comparing outputs of the first and second motion detection steps at each pixel with a threshold, and means for replacing pixels in said interpolation of said first field with corresponding matched pixels from said previous adjacent field whenever the first motion detection output exceeds said threshold and replacing pixels in said first interpolation of said first field with corresponding matched pixels from said following adjacent field whenever said second motion detection output exceeds said threshold.

5. The apparatus of claim 4, wherein said plurality of fields is whithin five fields.

6. The apparatus of claim 4 wherein said motion dectection means further includes a third motion detector for detecting areas of motion by comparing said field with adjacent fields and determining that motion is present in said areas if stripes occur.

7. The apparatus of claim 4 further comprising:

a video buffer and a plurality of processing elements.

8. The apparatus of claim 4 further comprising:

a storage medium for storing said plurality of fields.

9. The apparatus of claim 8, wherein said storage medium stores in a First-In-First-Out fashion.

10. A method of detecting motion in video sequences obtained from a video source, each of said video sequences including a plurality of fields, each of said plurality of fields including a plurality of lines, the method comprising:

performing a first motion detection step for detecting areas of motion by comparing said first field with a previous adjacent field;

performing a second motion detection stop for detecting areas of motion by comparing said first field with a following adjacent field; and performing a third motion detection step for detecting areas of motion by comparing said first field with previous and following adjacent fields and determining that motion is present in said areas if stripes occur.

11. The method of claim 10, wherein said plurality of fields is within five fields.

12. A computer-readable storage medium storing thereon a method executable by a computer for detecting motion in video sequences obtained from a video source, each of said video sequences including a plurality of fields, each of said plurality of fields including a plurality of lines, the method comprising:

performing a first motion detection step for detecting areas of motion by comparing said interpolation of said first field with a previous adjacent field;

performing a second motion detection step for detecting areas of motion by comparing said interpolation of said first field with a following adjacent field; and performing a third motion detection step for detecting areas of motion by comparing said interpolation of said first field with said previous and following adjacent fields and determine that motion is present in said areas if stripes occur.

\* \* \* \* \*

UNITED STATES PATENT AND TRADEMARK OFFICE
CERTIFICATE OF CORRECTION

PATENT NO.   : 6,340,990 B1
DATED        : January 22, 2002
INVENTOR(S)  : Stephen S. Wilson It is certified that error appears in the above-identified patent and that said Letters Patent is hereby corrected as shown below:

<u>Column 9,</u>
Line 5, replace "wit" with -- with --

<u>Column 10,</u>
Line 5, replace "stop" with -- step --

Signed and Sealed this

Ninth Day of July, 2002

Attest:

Attesting Officer

JAMES E. ROGAN
*Director of the United States Patent and Trademark Office*